UNITED STATES PATENT OFFICE.

GEORGE T. LEWIS, OF PHILADELPHIA, PENNSYLVANIA.

IMPROVEMENT IN THE MANUFACTURE OF SULPHO-ACETATE OF ALUMINA.

Specification forming part of Letters Patent No. 59,239, dated October 30, 1866.

*To all whom it may concern:*

Be it known that I, GEORGE T. LEWIS, of the city and county of Philadelphia, in the State of Pennsylvania, have invented a new and useful mode of manufacturing the Sulpho-Acetate of Alumina; and I do hereby declare that the following is a full and exact description of the same.

I employ the alumina obtained from the mineral known as "cryolite." The alumina may be either in a powder or pulp state. I prefer to use the pulp produced in the process of extracting the alumina from the mineral. To this pulp I add acetic acid, pure or impure, in sufficient quantity to produce an acetate of alumina.

I use about two and a half to three pounds of acetic acid, calculated dry, to one pound of alumina, calculated dry.

I stir the acid and the alumina well together, employing heat to facilitate the solution, and then add sulphuric acid in quantity, calculated dry, of about fifty (50) per cent. of the alumina; or, in place of the sulphuric acid, sulphate of alumina or alum in proportion of about fifty (50) per cent. of the alumina.

Having thus described my invention, I claim and desire to secure by Letters Patent—

The manufacture of sulpho-acetate of alumina by mixing the alumina extracted from cryolite with acetic acid and sulphuric acid, or, in place of the sulphuric acid, sulphate of alumina or alum, substantially as described.

GEORGE T. LEWIS.

Witnesses:
   J. E. SHAW,
   GEO. E. BUCKLEY.